United States Patent

Baba

[11] Patent Number: 5,946,108
[45] Date of Patent: Aug. 31, 1999

[54] FACSIMILE APPARATUS HAVING OPERATOR'S PRESENCE PRESUMING FUNCTION

[75] Inventor: Keizou Baba, Atsugi, Japan

[73] Assignee: Ricoh Company, Ltd., Tokyo, Japan

[21] Appl. No.: 08/592,951

[22] Filed: Jan. 29, 1996

Related U.S. Application Data

[62] Division of application No. 08/223,664, Apr. 6, 1994, Pat. No. 5,508,824.

[30] Foreign Application Priority Data

Apr. 13, 1993 [JP] Japan .................................. 5-85881

[51] Int. Cl.⁶ .............................. H04N 1/00; H04M 11/00
[52] U.S. Cl. ............... 358/468; 379/100.05; 379/100.16
[58] Field of Search ....................................... 358/468, 434, 358/441, 400; 379/100.01, 100.05, 100.15, 100.16, 372, 373; 399/9, 37, 75

[56] References Cited

U.S. PATENT DOCUMENTS

| | | | |
|---|---|---|---|
| 4,856,053 | 8/1989 | Hashimoto | 379/100.01 |
| 4,922,524 | 5/1990 | Baba et al. | 358/435 |
| 4,932,050 | 6/1990 | Davidson et al. | 379/211 |
| 5,146,489 | 9/1992 | Telibasa | 379/100.15 |
| 5,151,972 | 9/1992 | Lorenz et al. | 379/100.16 |
| 5,153,912 | 10/1992 | Sakakibara et al. | 379/100.15 |
| 5,301,035 | 4/1994 | Hayafune | 358/440 |
| 5,530,901 | 6/1996 | Nitta . | |
| 5,550,649 | 8/1996 | Wong et al. | 358/468 |

FOREIGN PATENT DOCUMENTS 4-256276  9/1992  Japan .............................. H04N 1/00

Primary Examiner—Scott Rogers
Attorney, Agent, or Firm—McDermott, Will & Emery

[57] ABSTRACT

A facsimile unit performs a facsimile reception operation of responding to a calling signal automatically and receiving transmitted facsimile data. A telephone unit performs a telephone reception operation of responding to a calling signal only after an operator responds to rings generated so that an operator may conduct a telephone conversation through the facsimile apparatus. A presuming unit presumes whether or not an operator is present based on certain obtained information. A selecting unit allows the facsimile unit to perform the facsimile reception operation and prevents the telephone from performing the telephone receiving operation if the presuming unit presumes that there is no operator. The selecting unit prevents the facsimile unit from performing the facsimile reception operation and allows the telephone to perform the telephone receiving operation if the presuming unit presumes that there is an operator.

6 Claims, 7 Drawing Sheets

FACSIMILE APPARATUS HAVING OPERATOR'S PRESENCE PRESUMING FUNCTION

This application is a division of application Ser. No. 08/223,664 filed Apr. 6, 1994 now U.S. Pat. No. 5,508,824.

BACKGROUND OF THE INVENTION

1. Field of the Invention

The present invention relates to a facsimile apparatus and in particular a facsimile apparatus which is connected to a telephone network via a single telephone line and has both facsimile function and telephone function or has a single facsimile function.

2. Related Art

In the related art, a facsimile apparatus has been used having telephone mode, facsimile mode and automatic switching mode. One mode is arbitrarily selected from among the three modes by the operator or is automatically activated in accordance with a preset time table. Such a facsimile apparatus may be efficiently used by selecting the optimum mode among the three modes.

However, in such a construction, the operator must perform the mode setting each time as is necessary so as to achieve the optimum mode setting, and the setting operations are inconvenient for the operator.

Another facsimile apparatus has a predetermined ring number such that a facsimile-data reception operation is started after the predetermined number of rings occur. The predetermined ring number may be altered. In a case where the predetermined ring number is previously set at a large number, the facsimile apparatus acts as a telephone set if the operator responds to the ringing signal before the predetermined number of rings occur and acts a facsimile-data receiver if not. On the other hand, by previously setting the predetermined ring number at a smaller number, the facsimile apparatus may be made to almost always act as the facsimile receiver accordingly.

However, the operator must alter the predetermined ring number each time as is necessary. The operator must reduce the predetermined ring number if the operator intends to use the apparatus as the facsimile receiver, the reduction operations being inconvenient for the operator. Further, if the operator forgets to reduce the predetermined ring number, time is wasted before the ringing tones occur in the predetermined ring number even if the operator intends to use the facsimile receiver function.

Another facsimile apparatus has a ring volume adjusting function. By appropriately adjusting the ring volume, the facsimile apparatus can cause even an operator who is located far from the apparatus to be aware of the incoming call immediately.

However, in a case where no operator exists near the apparatus, at night for example, the ringing tones act as noise for persons having no concern with the apparatus.

Another facsimile apparatus has a constant heat providing function of always providing heat to an image fixing unit which fixes a toner image formed on a recording sheet using the provided heat to be applied to the recording sheet with the toner image. The toner image is previously formed on the recording sheet by means of a well-known electrophotographic image forming unit. By the above function, since the heat is always provided to the image fixing unit, a relevant image can be output after being fixed on a recording sheet immediately without substantial delay, which image is currently being received through the facsimile function.

However, in a case where no operator exists around the apparatus, at night for example, a relevant image does not need to be output immediately even if the image is received through the facsimile function. Constantly providing heat to the image fixing unit even after-hours wastes heat energy.

SUMMARY OF THE INVENTION

An object of the present invention is to provide a facsimile apparatus which can eliminate the above problems from occurring.

To achieve the object of the present invention, a facsimile apparatus according to the present invention comprises:

facsimile means for performing a facsimile reception operation of responding to a calling signal automatically and receiving transmitted facsimile data;

telephone means for performing a telephone reception operation of responding to a calling signal only after an operator responds to the rings generated due to said incoming call so that an operator may conduct a telephone conversation through said facsimile apparatus;

presuming means for presuming whether or not an operator is present based on certain information;

selecting means for allowing said facsimile means to perform said facsimile reception operation and preventing said telephone from performing said telephone receiving operation if said presuming means presumes that there is no operator, said selecting means preventing said facsimile means from performing said facsimile reception operation and allowing said telephone to perform said telephone receiving operation if said presuming means presumes that there is an operator.

By this construction, the proper one is automatically selected from among the telephone reception mode and facsimile reception mode by presuming the presence of the operator using information concerning the light level in the office, for example. The telephone reception mode may be made to be selected during the day time while the operator is present and the facsimile reception mode may be made to be selected during the night time. Such automatic mode change is convenient for the operator because the operator's mode setting operation is eliminated.

Another facsimile apparatus comprises:

facsimile means for performing a facsimile reception operation of responding to a calling signal automatically after a predetermined number of rings have occurred and then receiving transmitted facsimile data;

telephone means for performing a telephone reception operation of responding to a calling signal only after an operator responds to the rings generated due to said calling signal so that an operator may conduct a telephone conversation through said facsimile apparatus;

presuming means for presuming whether or not an operator is present based on certain information;

altering means for altering said predetermined number of rings so that said predetermined number of rings in a case where said presuming means determines that the operator is present is greater than that in a case where said presuming means determines that no operator is present.

By this construction, the predetermined ring number is automatically and appropriately altered by presuming the presence of the operator using information concerning the light level of the office, for example. The predetermined ring number may be made to increase during the day time while the operator is present and may be made to be reduced during the night time. Such automatic predetermined ring number alteration is convenient for the operator because the operator's altering operation is eliminated. Further, ring generating time may be saved in the night time.

Another facsimile apparatus comprises:

facsimile means for performing a facsimile reception operation of automatically accepting an incoming call and receiving transmitted facsimile data;

telephone means for performing a telephone reception operation of accepting an incoming call only after an operator responds to the rings generated due to said incoming call so that an operator may conduct a telephone conversation through a telephone set connected to the telephone line;

presuming means for presuming whether or not an operator is present based on certain information;

disconnecting means for disconnecting said telephone set from said telephone line in a case where said presuming means determines that the operator is not present, said disconnecting means connecting said telephone set to said telephone line in a case where said presuming means determines that the operator is present;

and wherein said facsimile means performs the facsimile reception operation in a case where said telephone set has been disconnected from said telephone line.

By this construction, the connection/disconnection of the telephone set is automatically and appropriately performed by presuming the presence of the operator using information concerning the light level of the office, for example. The telephone set may be made to be connected during the daytime while the operator is present and may be made to be disconnected at night. Such automatic disconnection of the telephone set at night can eliminate purposeless ringing, noise thus being eliminated.

Another facsimile apparatus comprises:

electrophotography means for forming a toner image on a recording sheet using an electrophotography method;

fixing means for fixing said toner image on said recording sheet by applying heat onto said recording sheet with said toner image;

presuming means for presuming whether or not an operator is present based on certain information;

heat providing means for supplying heat to said fixing means constantly in a case where said presuming means determines that the operator is present whether or not the image fixing operation is currently being performed, said heat providing means stopping the constant supply of the heat to said fixing means in a case where said presuming means determines that no operator is present.

By this construction, the automatic control of heat supply to the fixing means is performed by presuming the presence of the operator using information concerning the light level of the office, for example. The heat supply to the fixing means may be maintained during the day time while the operator exists and may be made to be stopped during the night time. Such automatic stopping of the heat provision during the night time can save energy.

Another facsimile apparatus comprises:

accepting means for accepting an incoming call signal immediately after receiving the calling signal;

facsimile means for performing a facsimile reception operation of receiving transmitted facsimile data relevant to the accepted incoming call without generating any rings;

telephone means for generating rings in response to said incoming call signal so that the operator may conduct a telephone conversation by responding to said rings;

presuming means for presuming, after said accepting means accepts said incoming call, whether or not the operator is present based on certain information;

switching means for switching operation to be performed by said facsimile means and said telephone means so that said telephone means generates rings relevant to the calling signal in a case where said presuming means determines that the operator is present and said facsimile means starts the facsimile reception operation in a case where said presuming means determines that the operator is not present.

By this construction, the presuming operation, consisting of the light level detection for example, is needed only at a time a calling signal is coming and the relevant incoming call is immediately accepted, the control efficiency of the apparatus being thus improved since the presuming operation does not need to be always performed.

Other objects and further features of the present invention will become more apparent from the following detailed description when read in conjunction with the accompanying drawings.

DESCRIPTION OF THE PREFERRED EMBODIMENTS

Figure 1:
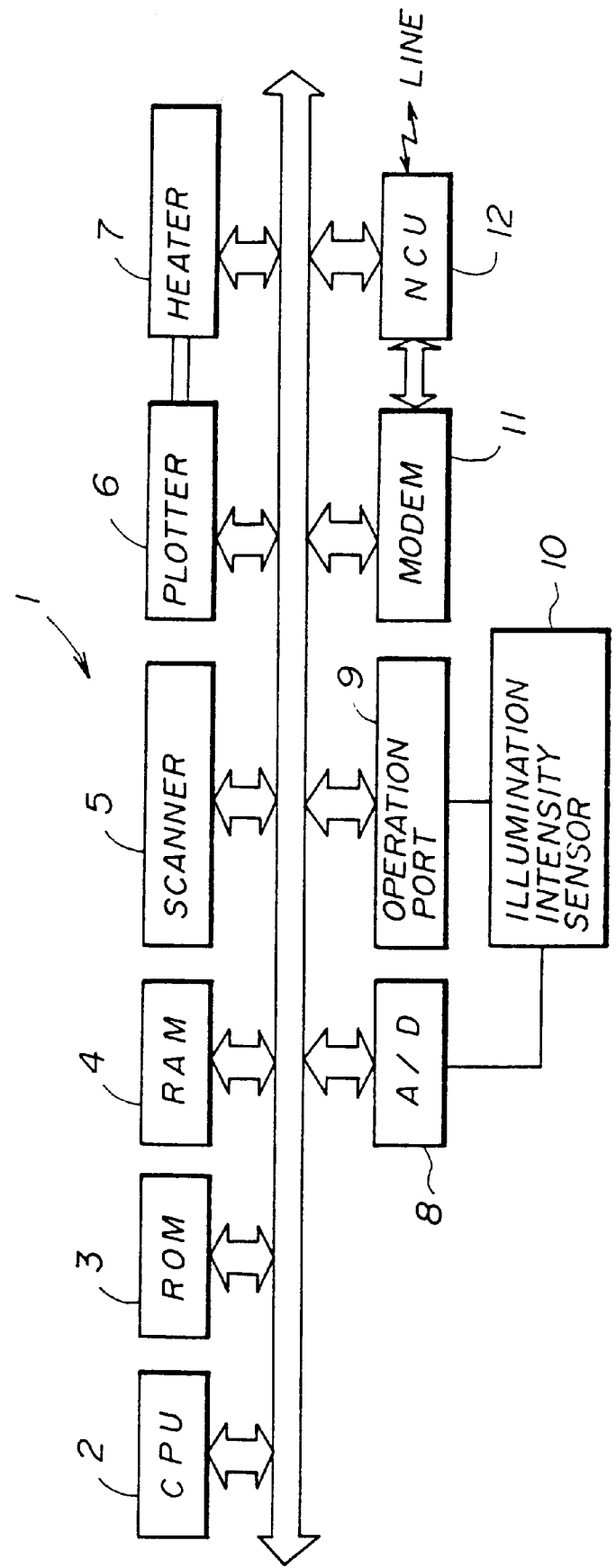
FIG. 1 shows a block diagram of a facsimile apparatus in any of first, second, third, fourth and fifth embodiments of the present invention.

Facsimile apparatuses in first through fifth embodiments of the present invention are described with reference to FIG. 1.

The facsimile apparatus 1, a basic block construction of which is common to the facsimile apparatuses in the first through fifth embodiments, includes CPU (Central Processing Unit) 2, ROM (Read Only Memory) 3, RAM (Random Access Memory) 4, scanner 5, plotter 6, heater 7, A/D (Analog/Digital Converter) 8, operation port 9, illumination-intensity sensor 10, modem 11 and NCU (Network Control Unit) 12.

The CPU 2 controls the entirety of the functions of the facsimile apparatus 1. The illumination-intensity sensor 10 measures the light level of the office in which the facsimile apparatus 1 is located. The A/D 8 converts the office illumination intensity detected by the sensor 10 into other illumination intensity data which the CPU 2 can process. The CPU 2 has a function of comparing the illumination intensity data with a predetermined threshold value. The CPU 2 has a function of automatically switching between two reception operation modes, namely, a facsimile reception mode and a telephone reception mode. In the facsimile reception mode, the facsimile apparatus 1 accepts an incoming call after detecting the relevant calling signal received by the apparatus 1. Then, the apparatus 1 receives the relevant facsimile data if it exists relevant to the accepted incoming call. In the telephone reception mode, the facsimile apparatus 1 does not accept the incoming call even if the arrival of relevant calling signal is detected before the operator responds to the rings. The CPU 2 automatically switches between the two reception operation modes depending on the results of the above comparison of the illumination intensity data with the predetermined value. The RAM 4 stores the current reception operation mode of the two reception operation modes. The operation port 9 displays the current reception operation mode.

The facsimile apparatus in the first embodiment of the present invention is described.

The illumination intensity sensor 10 acts as light level detecting means measures the illumination intensity relevant to the received light. The CPU 2 acts as operation mode setting means and sets the proper one of the above facsimile reception mode and telephone reception mode. If the CPU 2 determines the illumination intensity value detected by the illumination intensity sensor 10 is to be equal to or less than the above predetermined value, it sets the facsimile reception mode and if not, it sets the telephone reception mode.

Figure 3:
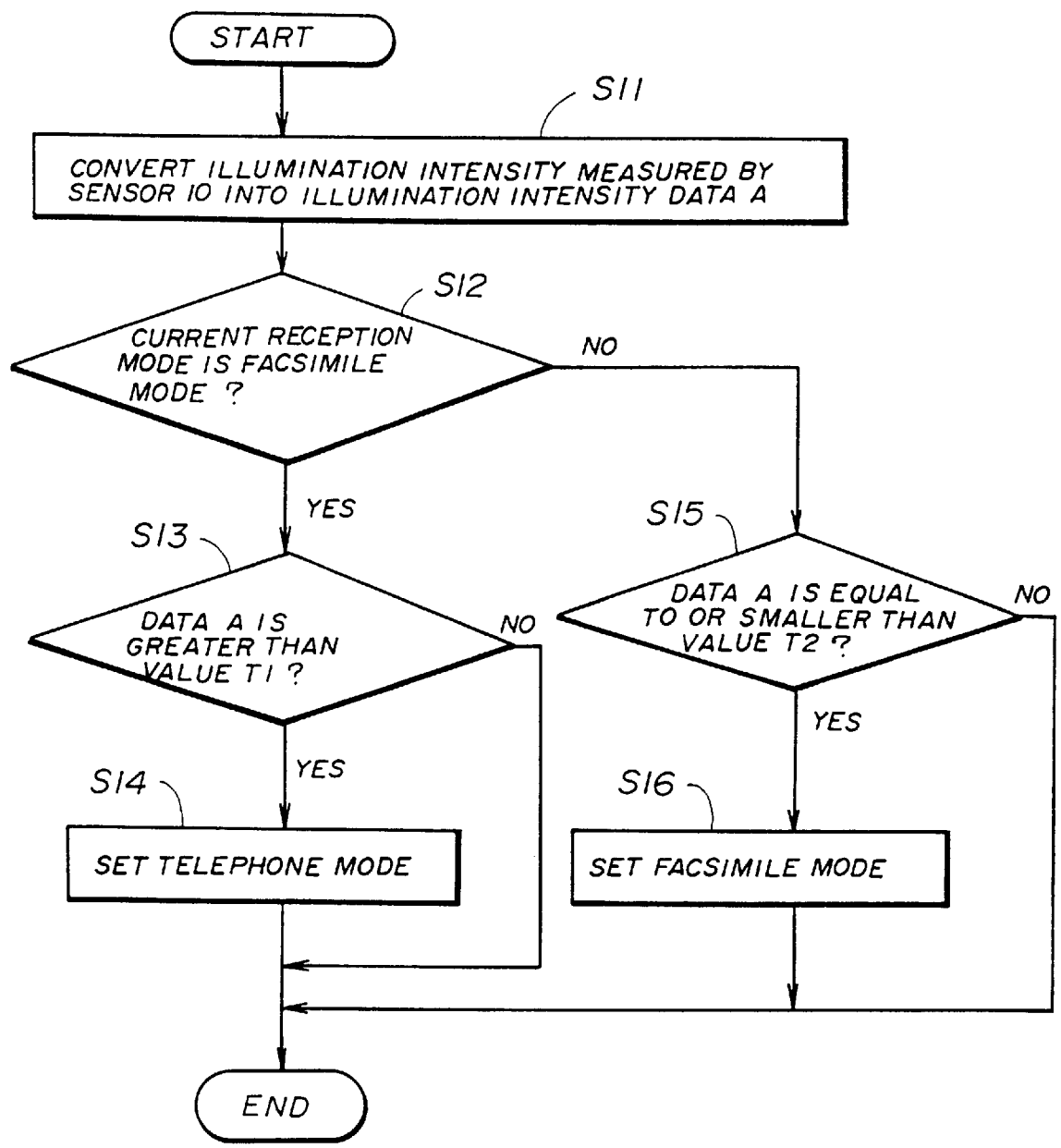
FIG. 3 shows an operation flow chart for altering a data reception mode in the facsimile apparatus of the first embodiment of the present invention.

The operation of the facsimile apparatus 1 in the first embodiment is described with reference to FIGS. 1 and 3. The term 'step' is omitted so that, a step S11 is referred to as simply S11, hereinafter.

Two threshold values T1 and T2 are previously determined, the value T1 being used to determine the transition from the state where the no light is on to the state where a light is on and the value T2 being used to determined the transition from the state where a light is on to the state where the light is off. These two threshold values T1 and T2 may be identical. However, in this embodiment, the value T1 is greater than the value T2, the greater value corresponding to the state where the light level is higher.

In S11, the current illumination intensity is detected by the sensor 10 and the thus detected illumination intensity is converted to the illumination intensity data A by the A/D 8 as mentioned above.

In S12, the CPU 2 examines as to whether the current reception operation mode is the facsimile reception mode or the telephone reception mode. If it is determined to be the facsimile reception mode in S12, the CPU 2 compares in S13 the relevant illumination intensity data A with the above threshold value T1. If the illumination intensity data A is determined to be greater than the value T1 in S13, the CPU 2 switches the current reception operation mode from the facsimile mode to the telephone mode in S14. Then, the CPU 2 stores information indicating the telephone reception mode as the reception operation mode in the RAM 4 and displays the same on the operation port 9. On the other hand, if the relevant illumination intensity data A is determined to be equal to or less than the value T1 in S13, the CPU 2 does not change the current reception operation mode.

If the current reception operation mode is determined to be the telephone reception mode in S12, the CPU 2 compares the illumination intensity data A with the value T2 in S15. If the illumination intensity data A is equal to or less than the value T2 in S15, the CPU 2 switches the current reception operation mode from the telephone reception mode to the facsimile reception mode in S16. Then, the CPU 2 stores information indicating the facsimile reception mode as the reception operation mode in the RAM 4 and displays the same on the operation port 9. On the other hand, if the relevant illumination intensity data A is determined to be greater than the value T2 in S15, the CPU 2 does not change the current reception operation mode.

The facsimile apparatus in the second embodiment of the present invention is described with reference to FIGS. 1 and 2.

The NCU 12 shown in FIG. 1 includes OH relay 13, calling signal detecting circuit 14 and DI switch 15.

The illumination intensity sensor 10 acts similarly to that in the facsimile apparatus in the above described first embodiment. The calling signal detecting circuit 14 acts as ring counting means together with the CPU 2. The calling signal detecting circuit 14 counts the rings. The operation port 9 acts as a ring counting number setting means together with the CPU 2 and is used to previously set a predetermined ringing counting number therethrough. The predetermined ringing counting number is a reference number such that the facsimile apparatus 1 accepts an incoming call and starts reception of the relevant facsimile data after the reference number of rings have occurred in the apparatus 1 relevant to the incoming call. The arbitrarily predetermined ring counting numbers could be input to the facsimile apparatus 1 by the operator through the operation port 9. In this embodiment, the predetermined ring counting numbers are 1 and 10. The CPU 2 selects the proper one from among the predetermined ring counting numbers previously set through the operation port 9. The CPU 2 compares the illumination intensity data detected through the sensor 10 and converted through the A/D 8 as mentioned above with a threshold level which will be mentioned. The CPU 2 selects the proper predetermined ring counting number so that the predetermined ring counting number is higher in a case where the detected illumination intensity value and is lower in a case where the detected illumination intensity data is equal to or less than the threshold value.

Figure 4:
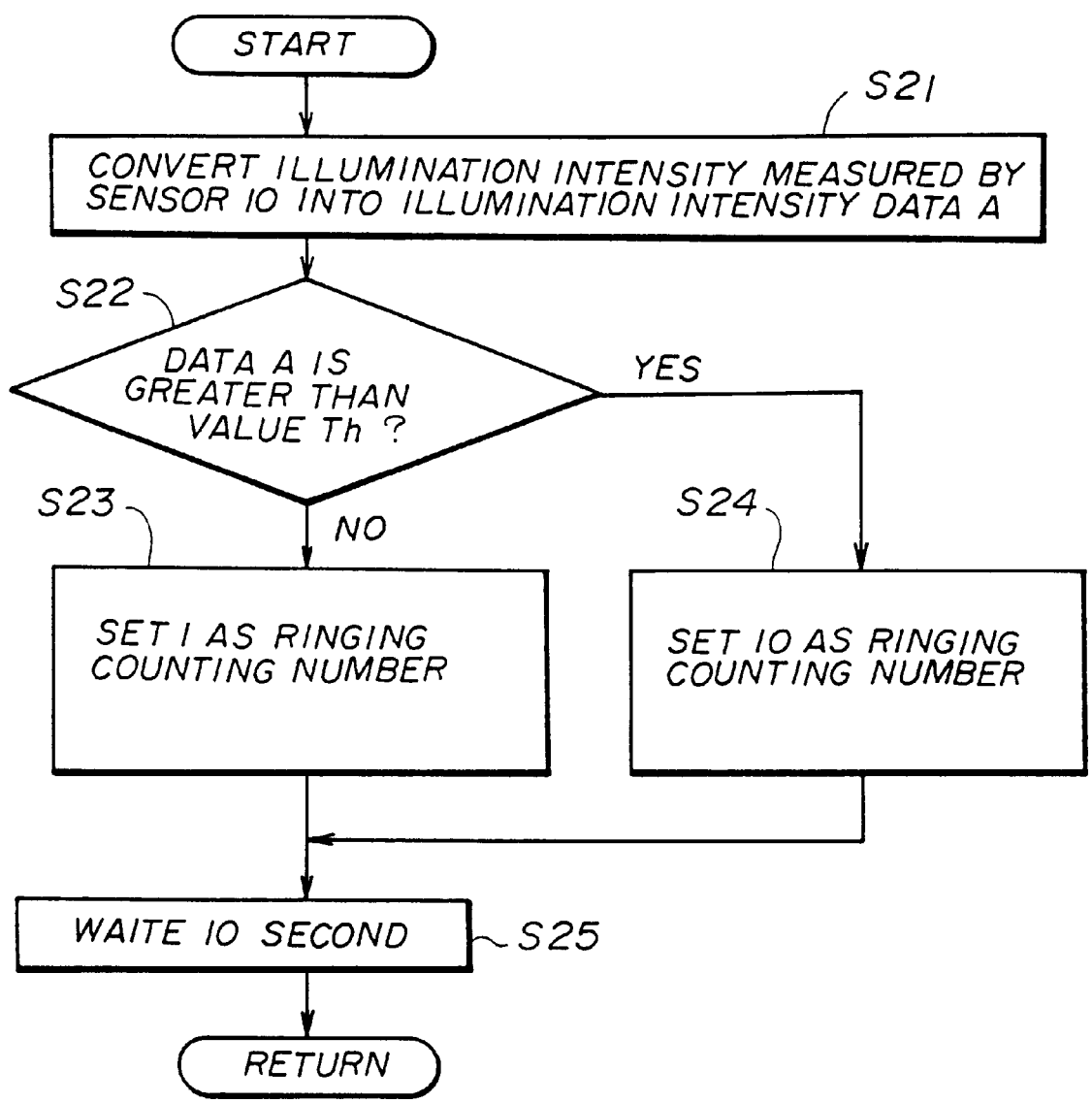
FIG. 4 shows an operation flow chart for altering a ring counting number in the facsimile apparatus of the second embodiment of the present invention.

The operation of the facsimile apparatus in the second embodiment is described with reference to FIGS. 1, 2 and 4.

In this embodiment, a single threshold value Th is previously determined, the value Th being used to determine the transition from the state where the no light is on to the state where a light is on and the same value Th being also used to determined the transition from the state where the light is on to the state where the put on light is off. It is also possible to use two different threshold values such as those T1 and T2 used in the above first embodiment instead of the single value Th, the greater value corresponding to the state where the light level is higher.

The illumination intensity data A is obtained as described above for the current light level in the office room in which the apparatus 1 is located, in S21.

If the illumination intensity data A is determined in S21 to be greater than the value Th, the above predetermined ring counting number 1 is selected in S22. Then, after 10 seconds, a previously set duration, have elapsed in S25, the illumination intensity is again obtained in S21. If, on the other hand, the illumination intensity data A is equal to or less than the value Th in S21, the above predetermined ring counting number 10 is selected in S22. Then, after 10 seconds, have elapsed in S25, the illumination intensity is again detected in S21.

In this second embodiment, the CPU 2 automatically reduces the predetermined ring counting number in a case where it is determined that no operator is present since it is determined that the lights for the office room are off. Thus, the time required for accepting an incoming call after the arrival of the relevant calling signal, may be reduced by reducing the number of rings occurring before the facsimile-data reception action is started. Further, since the relevant switching operation is automatically performed, the operator can be free from the relevant switching operation.

The facsimile apparatus in the third embodiment is described with reference to FIGS. 1 and 2.

The NCU 12 shown in FIG. 1 includes OH relay 13, calling signal detecting circuit 14 and DI switch 15.

Figure 5:
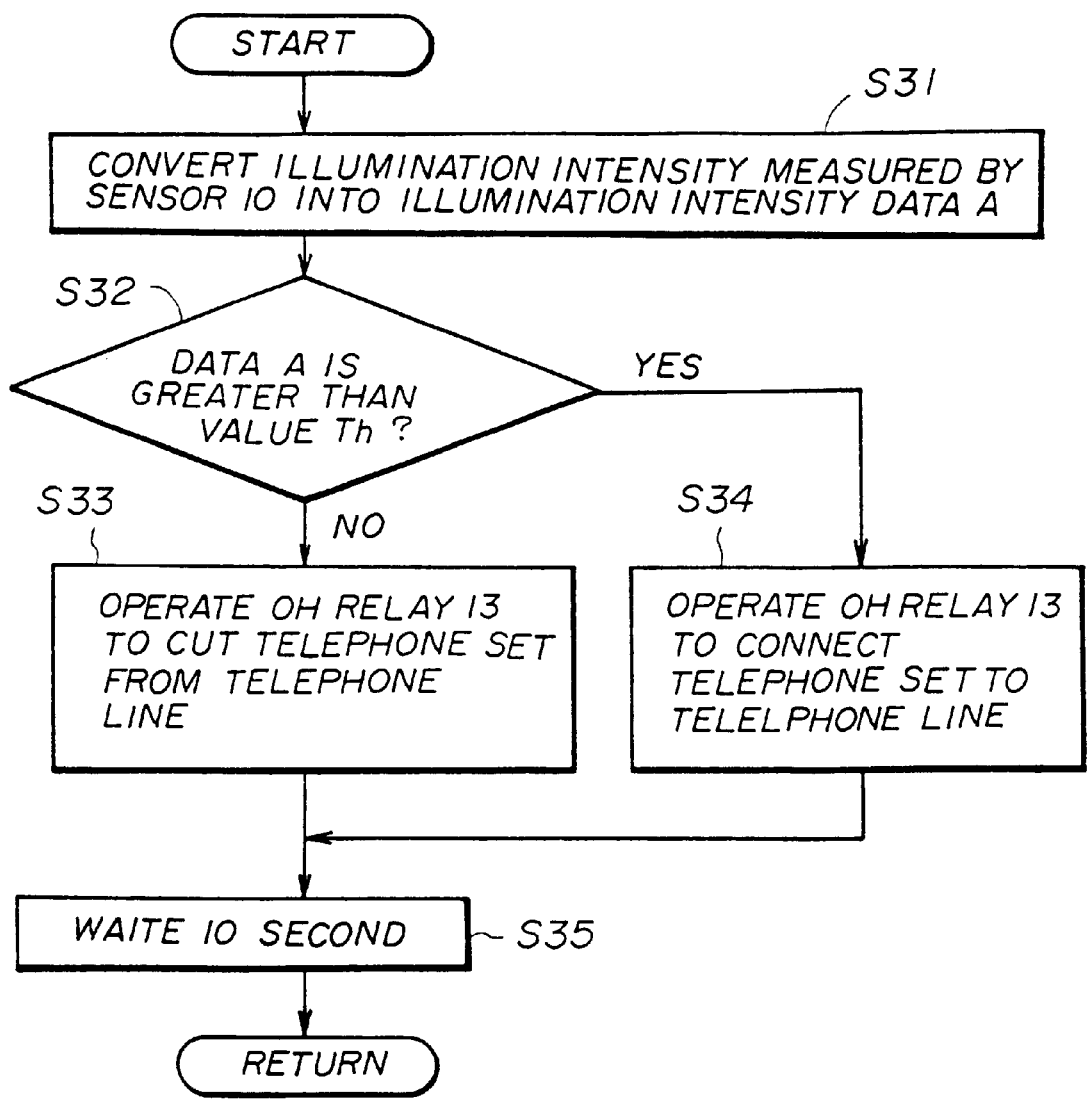
FIG. 5 shows an operation flow chart for connecting/disconnecting a telephone set to/from the telephone line in the facsimile apparatus of the third embodiment of the present invention.

The illumination intensity sensor 10 acts as that of any of the first and second embodiments. The OH relay 13 acts as telephone-handset connecting/disconnecting means and disconnects a telephone set shown in FIG. 2 from the telephone line if the illumination intensity detected by the sensor 10 is equal to or less than a threshold value which will be described. The OH relay 13 connects the telephone set to the telephone line if the illumination intensity detected by the sensor 10 is greater than the threshold value. Further, the facsimile apparatus 1 accepts an incoming call without generating any rings while the telephone set is in the state where it is not connected to the telephone line due to the disconnection. While the telephone set is in the state where it is connected to the telephone line, the facsimile apparatus 1 accepts the incoming call after the operator responds to rings generated relevant to the incoming call, The operation of the third embodiment is described with reference to FIGS. 1, 2 and 5.

In this embodiment, a single threshold value Th is previously determined, the value Th being used to determine the transition from the state where no light is on to the state where a light is on and the same value Th being also used to determined the transition from the state where a light is on to the state where the light is off. It is also possible to use two different threshold values such as T1 and T2 used in the above first embodiment instead of the single value Th, the greater value corresponding to the state where the light level is higher.

The illumination intensity data A is obtained as described above for the current light level in the office room in which the apparatus 1 is located, in S31.

If the illumination intensity data A is determined in S31 to be equal to or less than the value Th, the OH relay 13 operates so that the telephone set is disconnected from the telephone line in S33. As a result, the telephone set does not generate any rings if an incoming call is accepted by the facsimile apparatus 1. Then, after 10 seconds, a previously set duration, have elapsed in S35, the illumination intensity is again obtained in S31.

On the other hand, if the illumination intensity data A is greater than the value Th in S31, the OH relay 13 operates so that the telephone set is connected to the telephone line in S34. As a result, the telephone set generates rings if an incoming call is accepted by the facsimile apparatus 1 so that operator can find the call incoming. Then, after 10 seconds have elapsed in S35, the illumination intensity is again detected in S31.

The result of comparing the illumination intensity data value A with the threshold value Th can be seen to indicate whether or not the current time is in the after-hour time zone. Thus, if it is presumed to be after-hours, the facsimile apparatus 1 in the third embodiment automatically cuts the connection between the telephone set and the telephone line. As a result, noise due to the rings can be prevented from occurring.

The facsimile apparatus 1 in the fourth embodiment is described.

In the fourth embodiment, the illumination intensity sensor 10 acts as described above for the previously described embodiments. The plotter 6 acts as printing means for printing an image on a recording sheet using facsimile data received by the facsimile apparatus 1. The plotter 6 uses a well-known electrophotography technology to form a toner image on a recording sheet and typically has the following construction: A drum that is to be electrostatically charged is used in the plotter (printer) and the toner is held by the charge so as to form the toner image on the drum surface accordingly. The toner image is then transferred to the recording sheet. The toner image on the recording sheet is fixed by a fixing unit in the plotter using heat. The heater 7 acts as heat energy providing means for providing, to the fixing unit, the heat amount necessary to fix the toner image formed on a recording sheet. In a case where the illumination intensity data value detected through the illumination intensity sensor 10 is greater than a threshold value which will be described, the CPU 2 controls the heater 7 so that the heater always supplies heat to the plotter 6 at the proper rate required for printing an image whether or not the plotter 6 is currently to print the image as received facsimile data output. If the illumination value is not greater, the CPU 2 controls the heater 7 to stop provision of heat to the plotter 6.

Figure 6:
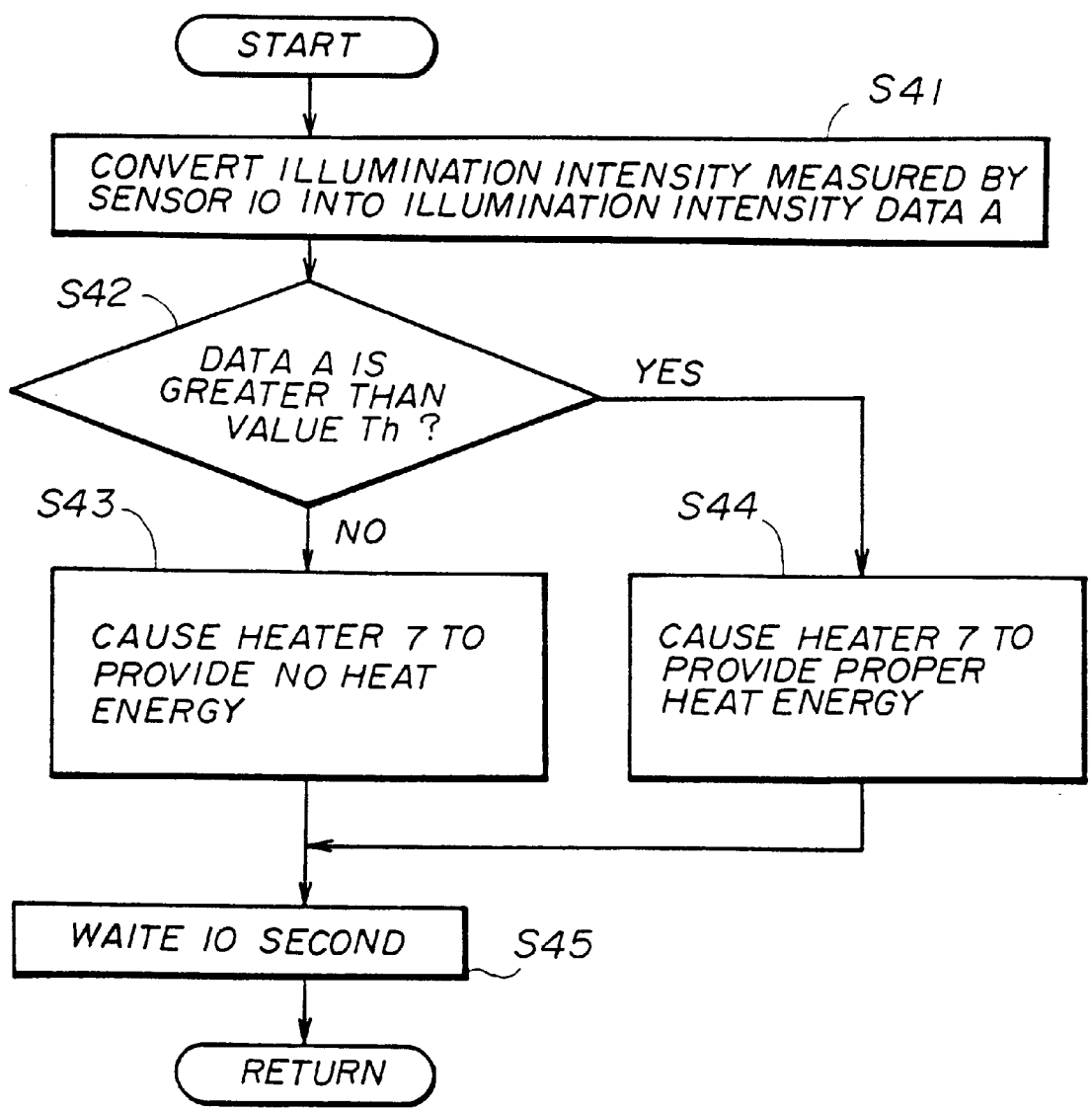
FIG. 6 shows an operation flow chart for controlling supply of heat to a plotter shown in FIG. 1 in the facsimile apparatus in the fourth embodiment of the present invention.

The operation of the facsimile apparatus 1 in the fourth embodiment is described with reference to FIGS. 1 and 6.

In this embodiment, a single threshold value Th is previously determined, the value Th being used to determine the transition from the state where the no light is on to the state where a light is on and the same value Th being also used to determined the transition from the state where the light is on to the state where the light is off. It is also possible to use two different threshold values such as T1 and T2 used in the above first embodiment instead of the single value Th, the greater value corresponding to the state where the light level is higher.

The illumination intensity data A is obtained as described above for the current light level in the office room in which the apparatus 1 is located, in S41.

If the illumination intensity data A is determined in S41 to be greater than the value Th, the CPU 2 controls the heater 7 to continuously supply heat at the above required rate to the plotter 6 by causing electric current to flow through the heater 7, in S44. Then, after 10 seconds, a previously set duration, have elapsed in S45, the illumination intensity is again obtained in S41. On the other hand, if the illumination intensity data A is equal or smaller than the value Th in S41, the CPU 2 controls the heater 6 to cut the provision of heat to the plotter 6 by cutting electric current flow through the heater 7, in S43. Then, after 10 seconds have elapsed in S45, the illumination intensity is again detected in S41.

Thus, the heat supply to the plotter 6 by the heater 7 is controlled depending on the comparison result of the current office illumination intensity data with the threshold value. Thus, during the time the operator is presumed to be present due to the greater illumination intensity, the facsimile apparatus 1 is in the state where heat is provided to the plotter 6 properly and thus received facsimile data can be immediately output as the image on the recording sheet. On the other hand, during the time the operator is presumed not to be present due to the lower illumination intensity, the facsimile apparatus 1 is in the state where no heat is provided to the plotter 6 and thus received facsimile data will not be output as the image on the recording sheet. Thus, electric power is saved.

Further, in the case of no heat being provided to the plotter 6, the received facsimile data may be temporarily held in a previously provided memory before the heater 7 starts provision of heat to the plotter 6 at the work starting time when the illumination intensity is likely to increased.

The facsimile apparatus 1 in a fifth embodiment is described with reference to FIGS. 1 and 2.

Figure 2:
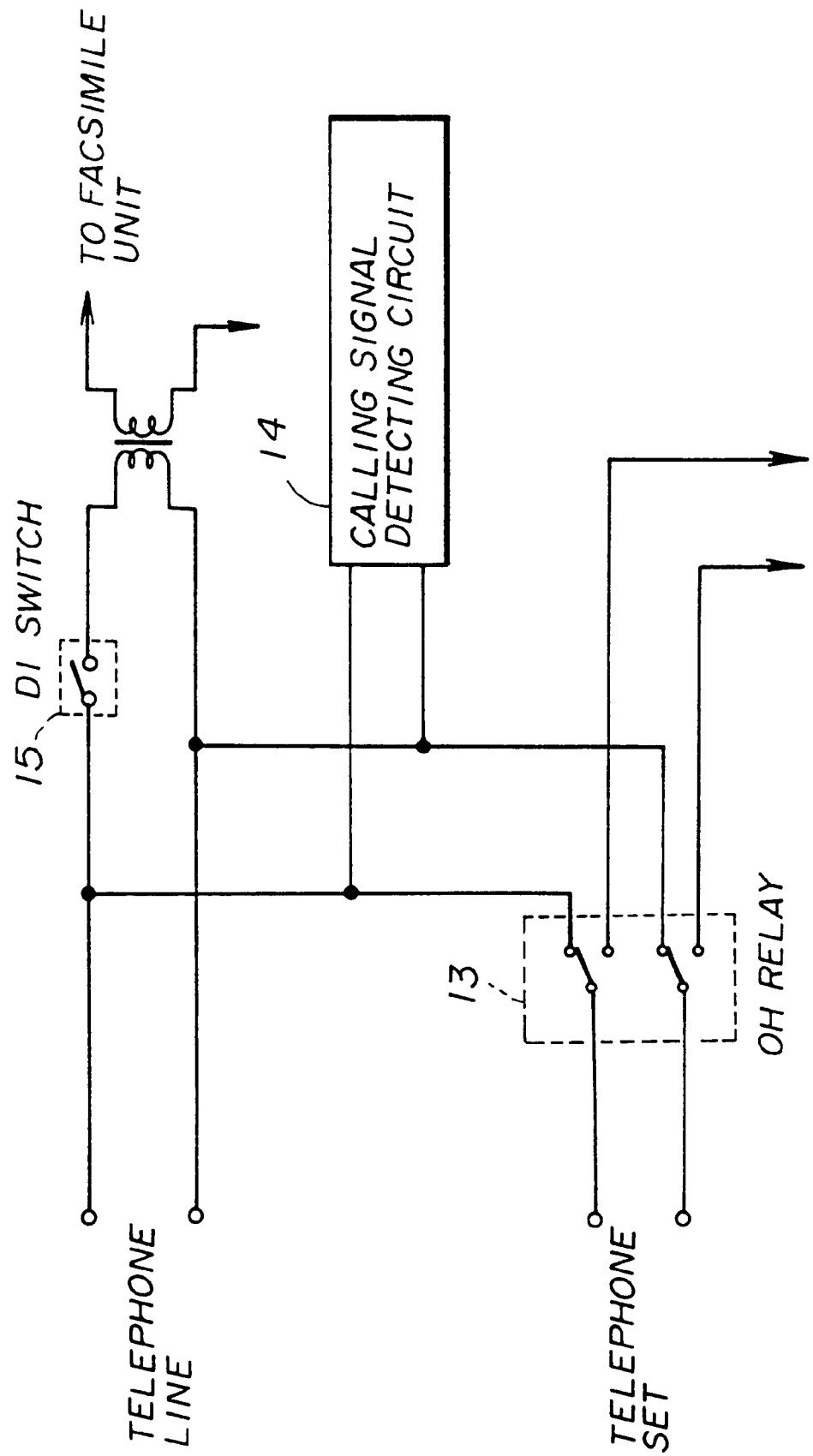
FIG. 2 shows a circuit diagram of an embodiment of an NCU shown in FIG. 1.

The NCU 12 shown in FIG. 1 includes OH relay 13, calling signal detecting circuit 14 and DI switch 15 as shown in FIG. 2.

The illumination intensity sensor 10 acts as described above for the above embodiments. The calling signal detecting circuit 14 detects arrival of a calling signal. The OH relay 13 acts together with the CPU 2 as no-ringing call accepting means and causes the apparatus 1 to accept an incoming call without generating any rings if the relevant ringing action is detected by the calling signal detecting circuit 14. If the illumination intensity detected by the illumination intensity sensor 10 is greater than a threshold value which will be described, the facsimile apparatus 1 causes the telephone set to generate rings due to the incoming call accepted by means of the no-ringing call accepting means so that the operator notices the incoming call. If not, the facsimile apparatus 1 receives the facsimile data transmitted relevant to the above accepted incoming call if the facsimile data exists.

Figure 7:
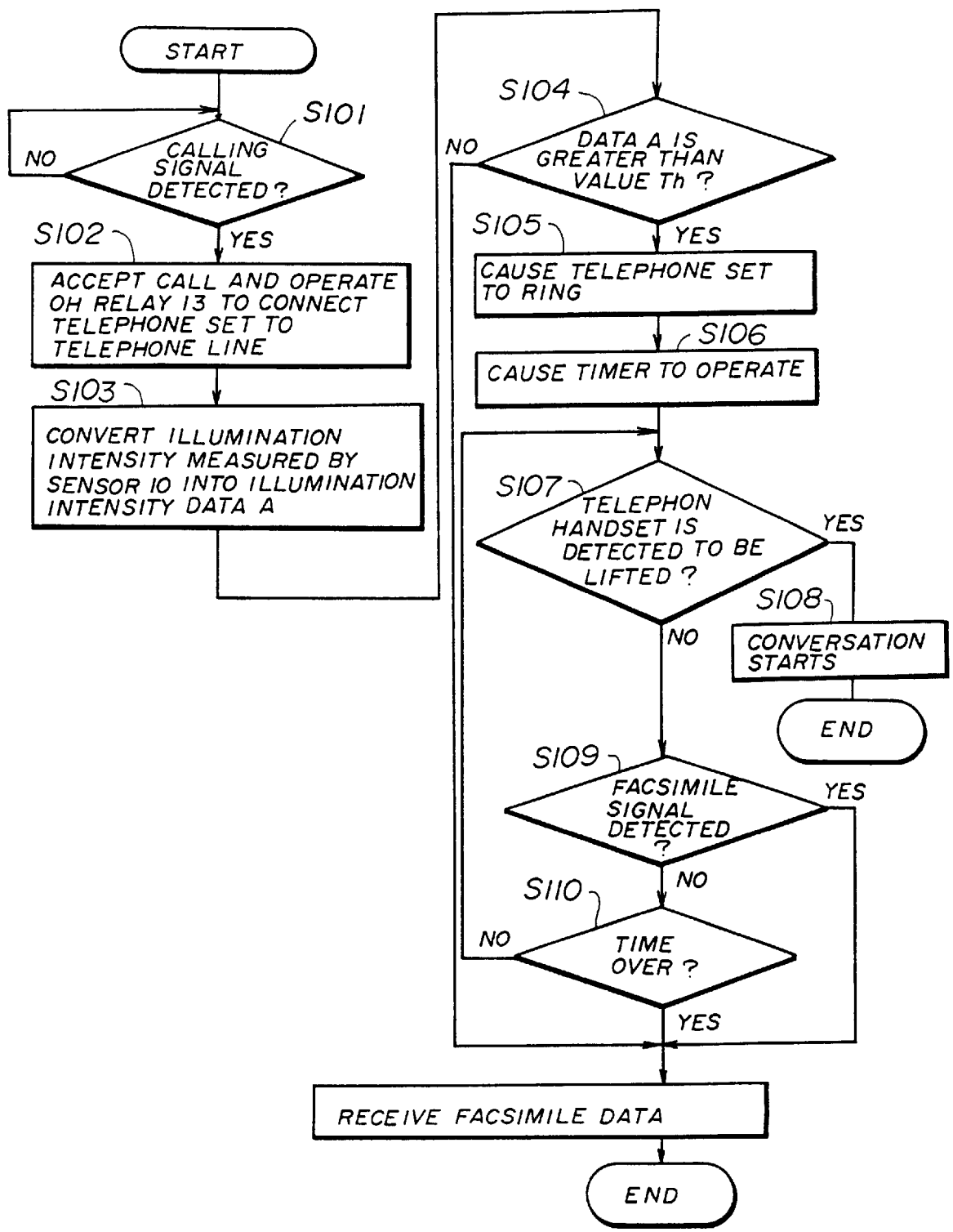
FIG. 7 shows an operation flow chart for altering a data reception mode in the facsimile apparatus of the fifth embodiment of the present invention.

The operation of the facsimile apparatus 1 in the fifth embodiment is described with reference to FIGS. 1, 2 and 7.

In this embodiment, a single threshold value Th is previously determined, the value Th being used to determine the transition from the state where the no light is on to the state where a light is on and the same value Th being also used to determined the transition from the state where the light is on to the state where the light is off. It is also possible to use two different threshold values such as T1 and T2 used in the above first embodiment instead of the single value Th, the greater value corresponding to the state where the light level is higher.

In S101, the OH relay 13 is made to be in the state where the telephone set is not connected to the telephone line before a calling signal is detected by the calling signal detecting circuit 14.

If arrival of a calling signal is detected in S101, the relevant call is accepted and the OH relay 13 is operated so that the telephone set is connected to the telephone line in S102. Then, the illumination intensity data A is obtained through the illumination intensity sensor 10 in S103 as described above. Then, if the illumination intensity data A is equal to or less than the threshold value Th, the facsimile apparatus 1 starts reception of the facsimile data in S111 if the facsimile data is being transmitted relevant to the above accepted incoming call.

In S104, if the illumination intensity data A is greater than the threshold value Th, the telephone set is made to generate rings in S105 and a timer having a preset time of 20 seconds is started to measure the time 20 seconds in S106. If the operator is detected to respond to the rings during the 20 seconds measured by the timer in S107, the telephone conversation is started relevant to the incoming call in S108.

On the other hand, if no operator is detected to respond to the rings in S108, it is determined in S109 whether or not arrival of a facsimile signal is detected. If the arrival is detected in S109, the facsimile apparatus 1 starts reception of the facsimile data relevant to the incoming call in S111.

If the operator does not respond to the rings and no arrival of a facsimile signal is detected in this operation cycle, it is determined in S110 whether or not the 20 seconds elapsed as measured by the timer. If not in S110, the detection of the operator's response and facsimile signal is repeated as described above. The operator's response may be detected by detecting the operator's lifting of the telephone handset for example.

If the 20 seconds elapsed in the timer in S110, it is presumed that the relevant incoming call relates to facsimile data transmission and the facsimile apparatus 1 attempts to start reception of the facsimile data which should arrive at.

Thus, in the fifth embodiment, the facsimile apparatus 1 accepts any incoming call without generating rings. After that, the apparatus 1 determines whether rings are to be generated or reception of the relevant facsimile data if it exists is to be started. The determination is made depending on the current office illumination intensity. Thus, the illumination intensity sensor 10 must work only at a time a calling signal arrives. Thus, the control operation efficiency is improved. Further by properly adjusting the time to be measured by the timer, the time for which ringing occurs may be controlled and thus noise occurrence due to unnecessarily repeated ringing may be prevented.

Further, the present invention is not limited to the above described embodiments, and variations and modifications may be made without departing from the scope of the present invention.

What is claimed is:

1. A facsimile apparatus comprising:

facsimile means for automatically responding to a calling signal after a predetermined number of rings have occurred and then receiving transmitted facsimile data;

telephone means for responding to a calling signal by going off-hook only after an operator responds to rings generated due to said calling signal so that an operator may conduct a telephone conversation through said facsimile apparatus;

presuming means for presuming whether or not an operator is present based on certain information;

altering means for altering said predetermined number of rings, automatically, to be greater when said presuming means determines that the operator is present than when said presuming means determines that no operator is present;

responding means for responding to the calling signal;

mode setting means for setting either a facsimile mode or a telephone mode;

control means for controlling the operation of said facsimile apparatus so that said control means allows said responding means to respond to the calling signal automatically in said facsimile mode so that transmitted facsimile data may be received and said control means prevents said responding means from responding to the calling signal before an operator responds to rings due to said calling signal; and light level detecting means for detecting the light level on said facsimile apparatus;

wherein said mode setting means sets said facsimile mode in a case where the light level detected by said light level detecting means has a value less than a predetermined threshold value and sets said telephone mode in a case where the light level detected by said light level detecting means has a value greater than a predetermined threshold value.

2. A facsimile apparatus comprising:

facsimile means for automatically responding to a calling signal after a predetermined number of rings have occurred and then receiving transmitted facsimile data;

telephone means for responding to a calling signal by going off-hook only after an operator responds to rings generated due to said calling signal so that an operator may conduct a telephone conversation through said facsimile apparatus;

presuming means for presuming whether or not an operator is present based on certain information;

altering means for altering said predetermined number of rings, automatically, to be greater when said presuming means determines that the operator is present than when said presuming means determines that no operator is present;

ring counting means for counting a number of rings generated by said facsimile apparatus;

ring number setting means for previously setting a ring number such that the facsimile apparatus starts reception of data transmitted to said facsimile apparatus after said facsimile apparatus generates said ring number of rings and no operator responds to said ring number of rings;

light level detecting means for detecting the light level value on said facsimile apparatus; and altering means for altering said predetermined number of rings so that said ring number is higher in a case where the light level value detected by said light level detecting means is greater than a predetermined value and is lower in a case where the detected light level value is less than said predetermined value.

3. A facsimile apparatus comprising:

facsimile means for automatically responding to a calling signal after a predetermined number of rings have occurred and then receiving transmitted facsimile data;

telephone means for responding to a calling signal by going off-hook only after an operator responds to rings generated due to said calling signal so that an operator may conduct a telephone conversation through said facsimile apparatus;

presuming means for presuming whether or not an operator is present based on certain information;

altering means for altering said predetermined number of rings, automatically, to be greater when said presuming means determines that the operator is present than when said presuming means determines that no operator is present, wherein said telephone means comprises a telephone set through which an operator may conduct a telephone conversation over a telephone line after the operator responds to rings generated due to an incoming call; and said facsimile apparatus further comprises:

light level detecting means for detecting the light level value on said facsimile apparatus;

disconnecting means for disconnecting said telephone set from the telephone line in a case where the light level value detected by said light level detecting means is less than a predetermined value, said disconnecting means connecting said telephone set to said telephone line in a case where the detected light level value is greater than a predetermined value;

and wherein said facsimile means performs the facsimile reception operation in a case where said telephone set has been disconnected from said telephone line.

4. A facsimile apparatus comprising:

facsimile means for automatically responding to a calling signal after a predetermined number of rings have occurred and then receiving transmitted facsimile data;

telephone means for responding to a calling signal by going off-hook only after an operator responds to rings generated due to said calling signal so that an operator may conduct a telephone conversation through said facsimile apparatus;

presuming means for presuming whether or not an operator is present based on certain information;

altering means for altering said predetermined number of rings, automatically, to be greater when said presuming means determines that the operator is present than when said presuming means determines that no operator is present;

wherein said facsimile means comprises electrophotography means for forming a toner image on a recording sheet using electrophotography, and fixing means for fixing said toner image on said recording sheet by applying heat to said recording sheet having said toner image, and said facsimile apparatus further comprises:

light level detecting means for detecting the light level value on said facsimile apparatus;

heat providing means for maintaining continuous supply of heat to said fixing means in a case where the light level value detected by said light level detecting means is greater than a predetermined value, said heat providing means stopping the continuous supply of the heat to said fixing means in a case where the detected light level value is less than said predetermined value.

5. A facsimile apparatus comprising:

facsimile means for automatically responding to a calling signal after a predetermined number of rings have occurred and then receiving transmitted facsimile data;

telephone means for responding to a calling signal by going off-hook only after an operator responds to rings generated due to said calling signal so that an operator may conduct a telephone conversation through said facsimile apparatus;

presuming means for presuming whether or not an operator is present based on certain information;

altering means for altering said predetermined number of rings, automatically, to be greater when said presuming means determines that the operator is present than when said presuming means determines that no operator is present;

accepting means for accepting an incoming call immediately after receiving the call signal;

light level detecting means for detecting, after said accepting means accepts said incoming call, the light level value on said facsimile apparatus; and switching means for switching operation to be performed by said facsimile means and said telephone means so that said telephone means generates rings in response to the calling signal in a case where the light level value detected by said light level detecting means is greater than a predetermined value, and said facsimile means starts the facsimile reception operation in a case where the detected light level value is less than said predetermined value.

6. A facsimile apparatus comprising:

facsimile means for automatically responding to a calling signal after a predetermined number of rings have occurred and then receiving transmitted facsimile data;

telephone means for responding to a calling signal by going off-hook only after an operator responds to rings generated due to said calling signal so that an operator may conduct a telephone conversation through said facsimile apparatus;

presuming means for presuming whether or not an operator is present based on certain information;

altering means for altering said predetermined number of rings, automatically, to be greater when said presuming means determines that the operator is present than when said presuming means determines that no operator is present;

a light level detector which detects a light value on said facsimile apparatus, and wherein said presuming means presumes the operator is present and increases the number of rings upon recording an indication from said light level detecting that said light level is above a threshold.

* * * * *